(12) United States Patent
Kwon et al.

(10) Patent No.: US 8,451,916 B2
(45) Date of Patent: May 28, 2013

(54) RELAY-BASED COMMUNICATION SYSTEM AND METHOD PROCESSING SIGNAL WITHOUT CYCLIC PREFIX

(75) Inventors: Ui Kun Kwon, Pohang-si (KR); Young-Doo Kim, Seoul (KR); Gi Hong Im, Pohang-si (KR); Dae-Young Seol, Pohang-si (KR); Won-Jae Shin, Yongin-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 1240 days.

(21) Appl. No.: 12/098,464

(22) Filed: Apr. 7, 2008

(65) Prior Publication Data

US 2010/0322140 A1 Dec. 23, 2010

(30) Foreign Application Priority Data

Jan. 2, 2008 (KR) .................. 10-2008-0000428

(51) Int. Cl.
*H04L 27/28* (2006.01)

(52) U.S. Cl.
USPC ........... 375/260; 375/267; 375/299; 375/247; 370/208; 370/210

(58) Field of Classification Search
USPC ................ 375/260, 267; 370/208, 210, 315, 370/321
See application file for complete search history.

(56) References Cited

U.S. PATENT DOCUMENTS

| | | | |
|---|---|---|---|
| 2003/0235147 A1 | 12/2003 | Walton et al. | |
| 2006/0105709 A1* | 5/2006 | Oh et al. | 455/13.1 |
| 2007/0036071 A1* | 2/2007 | Herdin | 370/210 |
| 2007/0036234 A1 | 2/2007 | Chen et al. | |
| 2007/0064824 A1 | 3/2007 | Wang et al. | |
| 2007/0150928 A1* | 6/2007 | Hottinen | 725/127 |
| 2008/0279301 A1* | 11/2008 | Khan et al. | 375/267 |

OTHER PUBLICATIONS

Dae-Young Seol; Ui-Kun Kwon; Gi-Hong Im; Eung-Sun Kim; , "Relay-based single carrier transmission with SFBC in uplink fast fading channels," Communications Letters, IEEE , vol. 11, No. 12, pp. 928-930, Dec. 2007.*

* cited by examiner

*Primary Examiner* — Daniel Washburn
*Assistant Examiner* — Eboni Hughes
(74) *Attorney, Agent, or Firm* — NSIP Law (57) ABSTRACT

A relay-based communication system and method processing a signal without a cyclic prefix is provided. An apparatus for generating a relay signal includes a signal receiving unit which receives a source signal transmitted from a source node to a relay node and detects a received signal, a signal conversion unit which extracts samples corresponding to a first time duration from the received signal, sums the received signal and the extracted samples in a second time duration, and generates a converted received signal, a relay signal generation unit which generates a relay signal cooperating with the source signal based on the converted received signal according to a space frequency block code (SFBC) scheme, and a signal transmission unit which transmits the generated relay signal to a destination node.

22 Claims, 8 Drawing Sheets

RELAY-BASED COMMUNICATION SYSTEM AND METHOD PROCESSING SIGNAL WITHOUT CYCLIC PREFIX

CROSS-REFERENCE TO RELATED APPLICATION

This application claims the benefit under 35 U.S.C. §119(a) of a Korean Patent Application No. 10-2008-0000428, filed on Jan. 2, 2008, in the Korean Intellectual Property Office, the entire disclosure of which is incorporated herein by reference.

TECHNICAL FIELD

Methods and apparatus consistent with the following description relate to a technology which generates a relay signal, cooperating with a source signal transmitted from a source node, and in which the source signal and the relay signal are received by a destination node, and more particularly, to a technology which improves a frequency efficiency by using a source signal and relay signal without a cyclic prefix.

BACKGROUND

Users and service members of a communication service require high-speed and high-quality communication service with low price. An orthogonal frequency division multiplexing (OFDM) scheme may be used to achieve a high-speed data transmission rate.

The OFDM scheme may transmit signals without being affected by frequency-selective fading. However, since the OFDM scheme has several known disadvantages, communication technologies using multiple antennas have become the focus of research to overcome the known disadvantages.

Generally, since a receiver wirelessly receiving a signal is limited in terms of volume, size, and power, multiple antennas are installed in a transmitter. Accordingly, complexity of the receiver may be reduced, and performance may be improved due to decreasing performance degradation caused by a multi-path fading.

When a transmitter is a mobile terminal of a user, it is difficult to install multiple antennas in a mobile terminal. To obtain a transmission diversity effect through multiple antennas installed in a mobile terminal, the multiple antennas may be required to be completely separated. Accordingly, a size of a mobile terminal may increase.

Thus, technologies related to a relay-based space frequency block code (SFBC) communication system which may maintain the size of a mobile terminal to be small and obtain a high transmission diversity effect are provided. The relay-based SFBC communication system includes a source node, relay node, and destination node. A source signal transmitted from a source node and a relay signal transmitted from a relay node, are a space frequency block coded signal. A destination node receives the source signal and relay signal through a wireless channel, and thus a diversity effect may be obtained.

In general, a source signal and a relay signal include a cyclic prefix. A cyclic prefix is inserted to prevent interference among symbols or channels. However, as time taken up by a cyclic prefix increases, time available for data decreases. This, in turn, prevents a high data transmission rate.

Accordingly, there is a need for a technology which may embody a relay-based SFBC communication system without using a cyclic prefix.

SUMMARY

According to an aspect, there is provided an apparatus for generating a relay signal, the apparatus including a signal receiving unit which receives a source signal transmitted from a source node to a relay node and detects a received signal, a signal conversion unit which extracts samples corresponding to a first time duration from the received signal, sums the received signal and the extracted samples in a second time duration, and generates a converted received signal, the second time duration being different from the first time duration, a relay signal generation unit which generates a relay signal cooperating with the source signal based on the converted received signal according to a space frequency block code (SFBC) scheme, and a signal transmission unit which transmits the generated relay signal to a destination node.

According to another aspect, there is provided an apparatus for receiving a signal, the apparatus including a signal receiving unit which receives a source signal, transmitted from a source node to a destination node, and a relay signal, transmitted from a relay node to the destination node, and detects a received source signal and a received relay signal, the source signal and the relay signal being coded according to a SFBC scheme, a signal conversion unit which converts the received source signal to form a first channel matrix of a first channel into a circulant matrix using samples, corresponding to a first time duration and being extracted from the received source signal, and converts the received relay signal to form a second channel matrix of a second channel into the circulant matrix using samples, corresponding to a second time duration and being extracted from the received relay signal, the first channel being formed between the source node and the destination node, and the second channel being formed between the relay node and the destination node, and a Fourier transformer which converts the converted received source signal and the converted received relay signal into signals in a frequency domain.

According to still another aspect, there is provided a relay signal generation method of a relay node, the method including receiving a source signal transmitted from a source node to a relay node and detecting a received signal, extracting samples corresponding to a first time duration from the received signal, summing the received signal and the extracted samples in a second time duration, and generating a converted received signal, the second time duration being different from the first time duration, generating a relay signal cooperating with the source signal based on the converted received signal according to an SFBC scheme, and transmitting the generated relay signal to a destination node.

According to yet another aspect, there is provided a signal receiving method of a destination node, including receiving a source signal, transmitted from a source node to a destination node, and a relay signal, transmitted from a relay node to the destination node, and detecting a received source signal and a received relay signal, the source signal and the relay signal being coded according to a SFBC scheme, converting the received source signal to form a first channel matrix of a first channel into a circulant matrix using samples, corresponding to a first time duration and extracted from the received source signal, and converting the received relay signal to form a second channel matrix of a second channel into the circulant matrix using samples, corresponding to a second time duration and extracted from the received relay signal, the first channel being formed between the source node and the destination node, and the second channel being formed between the relay node and the destination node, and converting the converted received source signal and the converted received relay signal into signals in a frequency domain.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
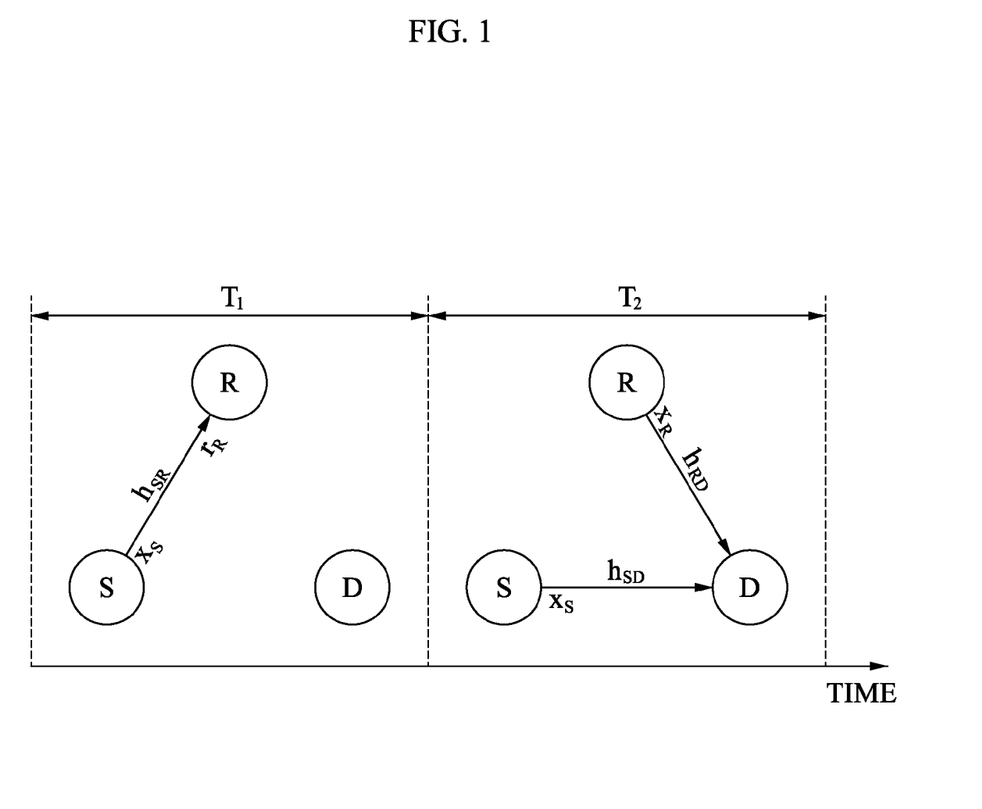
FIG. 1 is a diagram illustrating a source node, relay node, and destination node according to an exemplary embodiment.

FIG. 1 is a diagram illustrating a source node, relay node, and destination node according to an exemplary embodiment.

Referring to FIG. 1, S denotes the source node, R denotes the relay node, and D denotes the destination node. The source node may be a mobile terminal of a user, and the destination node may be a base station.

The source node transmits a source signal $x_S$ to the relay node for a time T1. In this instance, the source signal is desired to be transmitted to the destination node, and a wireless channel is formed between the source node and relay node. A vector of the wireless channel may be represented as $h_{SR}$. Multi-path may exist between the source node and the relay node. Accordingly, $h_{SR}$ is a vector of a multi-path fading channel, and may be represented as $h_{SR}=[h_{SR}(0), \ldots, h_{SR}(L_{SR})]^T$. Here, $L_{SR}$ is a length of a channel impulse response of a channel formed between the source node and the relay node.

The relay node receives a source signal $x_S$ transmitted from the source node through the wireless channel for the time T1. Since the source signal $x_S$ is transmitted through the wireless channel, a received signal $r_R$ received by the relay node may be represented as, $$r_R = \sqrt{E_{SR}} H_{SR} x_S + n_R \qquad \text{[Equation 1]}$$

where $n_R$ denotes noise, $E_{SR}$ denotes an energy coefficient of the channel between the source node and the relay node, and $H_{SR}$ denotes a channel matrix of the channel between the source node and the relay node.

Also, the relay node receiving the source signal $x_S$ for the time T1 through the wireless channel generates a relay signal $x_R$ based on the received signal $r_R$. The relay signal $x_R$ and the source signal $x_S$ are signals coded according to a space frequency block code (SFBC) scheme. Since the relay signal $x_R$ cooperates with the source signal $x_S$, a transmission diversity effect may be generated.

That is, the source node and relay node operate as a virtual transmitter including multiple antennas, and thus the transmission diversity effect may be obtained. Accordingly, although a smaller number of antennas are installed in the source node, the transmission diversity effect may be obtained using the antennas of the relay node. Thus, the source node may be manufactured in a small size.

In this instance, the source node and the relay node transmit the source signal $x_S$ and the relay signal $x_R$ to the destination node, respectively. The destination node may be the base station, and the relay node may be an ordinarily installed relay. $h_{SD}$ is a channel vector of a wireless channel formed between the source node and destination node, and $h_{RD}$ is a channel vector of a wireless channel formed between the relay node and destination node. Here, $h_{RD}$ is $h_{RD}=[h_{RD}(0), \ldots, h_{RD}(L_{RD})]^T$, and $L_{RD}$ is a length of a channel impulse response of a channel formed between the relay node and the destination node. Also, $h_{SD}$ is $h_{SD}=[h_{SD}(0), \ldots, h_{SD}(L_{SD})]^T$, and $L_{SD}$ is a length of a channel impulse response of a channel formed between the source node and the destination node.

Figure 2:
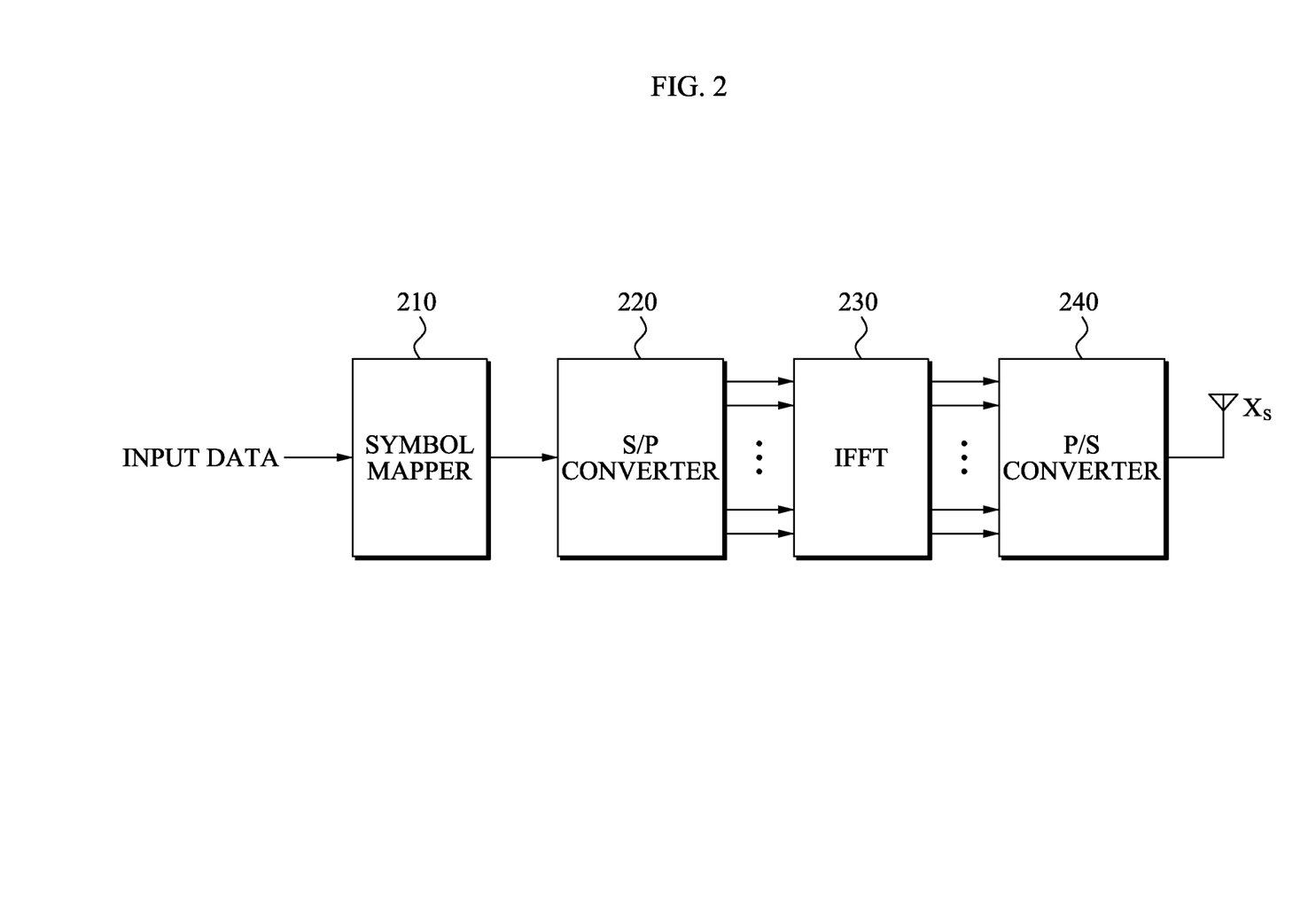
FIG. 2 is a block diagram illustrating an apparatus for generating a source signal according to an exemplary embodiment.

FIG. 2 is a block diagram illustrating an apparatus for generating a source signal according to an exemplary embodiment.

Referring to FIG. 2, the apparatus for generating a source signal includes a symbol mapper 210, a serial to parallel (S/P) converter 220, an Inverse Fast Fourier Transformer (IFFT) 230, and a parallel to serial (P/S) converter 240.

Input data is inputted to the symbol mapper 210. The input data may be data encoded and interleaved. The symbol mapper 210 may map the input data using a variety of modulation schemes and generate a data symbol. For example, the symbol mapper 210 may map the input data based on a $2^M$-phase shift keying (PSK) or $2^M$-quadrature amplitude modulation (QAM).

The S/P converter 220 separates in time the mapped data symbol in parallel, and outputs the separated data symbol to the IFFT 230. The IFFT 230 converts the mapped data symbol into a time domain signal, and outputs the converted time domain signal to the P/S converter 240. The converted time domain signal passes through the P/S converter 240, and a source signal $x_S$ is generated.

In general, the source signal $x_S$ includes a cyclic prefix in order to prevent an interference generated among sub-channels and interference generated among adjacent symbols. Accordingly, a receiving end may represent a channel matrix as a circulant matrix.

According to an aspect, a scheme where the receiving end converts a received signal through a simple operation to obtain the channel matrix in the circulant matrix form, when the source signal $x_S$ does not include the cyclic prefix, is provided.

Figure 3:
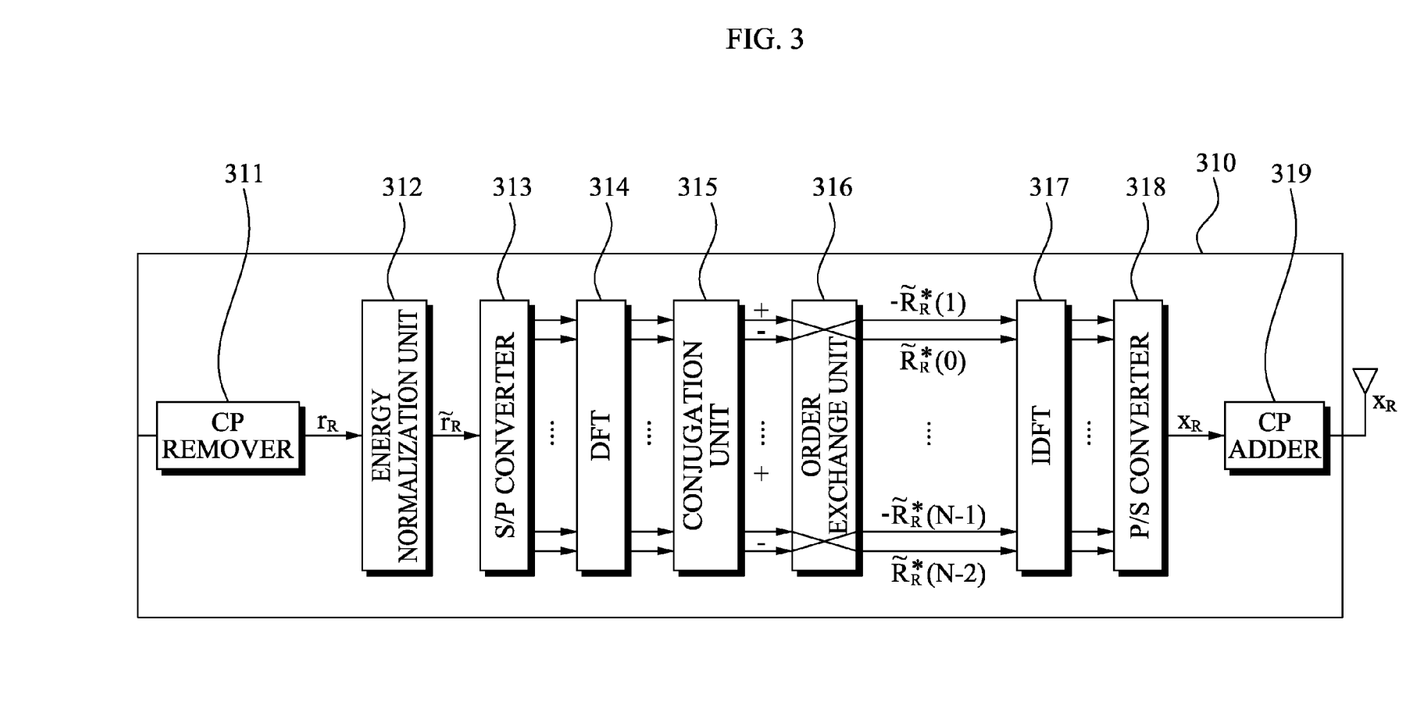
FIG. 3 is a diagram illustrating characteristics of a relay signal according to an exemplary embodiment.
Figure 3A:
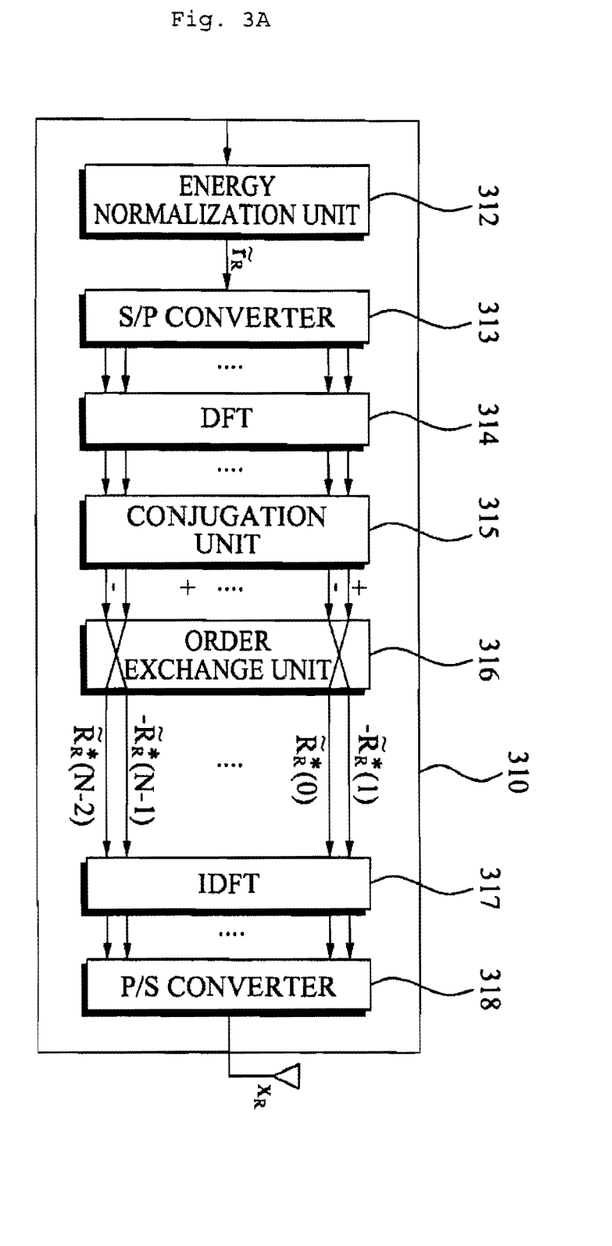
FIG. 3A illustrates a relay according to an exemplary embodiment.

FIG. 3 is a diagram illustrating characteristics of a relay signal according to an exemplary embodiment. FIG. 3A illustrates a relay according to an exemplary embodiment.

The diagram illustrated in FIG. 3 is provided for describing characteristics of a relay signal, and the relay signal according to an exemplary embodiment may be generated through units illustrated in FIG. 3 and other unit(s) known or to be known not illustrated in FIG. 3. That is, a source signal $x_S$ and a relay signal $x_R$ may not include a cyclic prefix, and the relay signal $x_R$ may be generated through a variety of operations in a time domain.

Referring to FIG. 2, when the source signal $x_S$ transmitted from a source node includes the cyclic prefix, the cyclic prefix is removed by a cyclic prefix remover 311. After the cycli prefix is removed, a received signal $r_R$ may be represented as Equation 1.

An energy normalization unit 312 may normalize the received signal $r_R$ as a unity energy signal $\tilde{r}_R$ having an energy size of 1. The unity energy signal $\tilde{r}_R$ may be represented as, $$\tilde{r}_R = \frac{r_R}{\sqrt{\frac{2}{E_{S_1R} + E_{S_1R} + \sigma_w^2}}} = \gamma_R r_R \qquad \text{[Equation 2]}$$

The unity energy signal $\tilde{r}_R$ is separated by the S/P converter 313 in a time domain, and converted into a frequency domain received signal $\tilde{R}_R$ by the DFT 314.

A spectrum corresponding to an even-numbered frequency element of the frequency domain received signal $\tilde{R}_R$ may be represented as $\tilde{R}_R(2l)$. A spectrum corresponding to an odd-numbered frequency element of the frequency domain received signal $\tilde{R}_R$ may be represented as $\tilde{R}_R(2l+1)$ 1 is a positive number from 0 to N/2-1.

Through a conjugation unit 315 and an order exchange unit 316, the frequency domain received signal $\tilde{R}_R$ may be coded as, $$\begin{bmatrix} X_R(2l+1) \\ X_R(2l) \end{bmatrix} = \begin{bmatrix} -\tilde{R}_R^*(2l+1) \\ \tilde{R}_R^*(2l) \end{bmatrix} \qquad \text{[Equation 3]}$$

where l is a positive number from 0 to N/2-1.

Referring to Equation 3, it may be known that a relay signal $X_R$ in Equation 3 is coded according to the SFBC scheme.

The relay signal $X_R$ in a frequency domain is converted into a time domain signal through an Inverse Discrete Fourier Transformer (IDFT) 317. The converted time domain signal is integrated through a P/S converter 318, and a relay signal $x_R$ in a time domain is generated.

According to one embodiment illustrated by FIG. 3, the relay signal $x_R$ includes a cyclic prefix through a cyclic prefix adder 319. According to another embodiment illustrated by FIG. 3A, the relay signal $x_R$ does not include a cyclic prefix. The relay signal $x_R$ is transmitted to a destination node, and the cyclic prefix is inserted to form a channel matrix into a circulant matrix. The channel matrix is formed between the destination node and a relay node.

According to certain exemplary embodiment, however, although the relay signal $x_R$ does not include the cyclic prefix, the destination node may convert or manipulate a received signal to form the channel matrix between the destination node and the relay node into the circulant matrix. Converting the received signal is described in detail with reference to FIGS. 4 through 6.

The relay signal $X_R$ in the frequency domain with respect to the generated relay signal $x_R$ may be represented as, $$X_R = F^{-1}PS\{F\tilde{r}_R\}^* \qquad \text{[Equation 4]}$$
$$= \gamma_R\{\sqrt{E_{S_1R}}\,F^{-1}PS\{FH_{S_1R}X_1\}^* +$$
$$\sqrt{E_{S_2R}}\,F^{-1}PS\{FH_{S_2R}X_2\}^*\} + w_R'$$

$$w_R' = \frac{\sqrt{2}\,F^{-1}PS\{Fw_R\}^*}{\sqrt{E_{S_1R} + E_{S_2R} + N_0}}$$

$$S = I_{\frac{N}{2}\times\frac{N}{2}} \otimes \begin{bmatrix} 1 & 0 \\ 0 & -1 \end{bmatrix}$$

$$P = I_{\frac{N}{2}\times\frac{N}{2}} \otimes \begin{bmatrix} 0 & 1 \\ 1 & 0 \end{bmatrix}$$

where F denotes a Fast Fourier Transformation matrix, and $\otimes$ denotes a Kronecker product operator.

In this instance, an apparatus for generating a relay signal according to an exemplary embodiment may generate the relay signal $x_R$ through an operation in the time domain. Accordingly, the relay signal $x_R$ is identical to the relay signal $X_R$ in the frequency domain. Also, the relay signal $x_R$ in the time domain may be generated through the operation in the time domain without performing calculations in Equation 4.

Hereinafter, an operation of generating a relay signal using calculations in a time domain is described.

When a conjugate value of a unity energy signal $\tilde{R}_R$ in a frequency domain is $\tilde{R}_R^*$ in a unity energy signal $\tilde{r}_R$ and the unity energy signal $\tilde{R}_R$ in the frequency domain, a time domain signal corresponding to the conjugate value $\tilde{R}_R^*$ may be represented as, $$\tilde{r}_R^*(-n)_N = r_c(n) \qquad \text{[Equation 5]}$$

where $(A)_N$ denotes a remainder obtained by dividing A into N.

The time domain signal corresponding to the conjugate value $\tilde{R}_R^*$ may be represented as $\tilde{r}_R^*(-n)_N$ using a symmetry property of Discrete Fourier Transformation (DFT). Here, for example, $(A)_N$ is a remainder obtained by dividing A into N through a modulo operation.

When performing the DFT with respect to both members of Equation 5, Equation 6 may be generated as, $$\tilde{R}_R^* = R_c = Wr_c \qquad \text{[Equation 6]}$$

where W denotes a root of unity complex multiplicative constants.

Each of an even-numbered frequency element and odd-numbered frequency element of the conjugate value $\tilde{R}_R^*$ may be calculated using $D_e$ and $D_o$ in Equation 7 which may be represented as, $$D_e = [1,0,1,0,1\ldots 1,0,1,0]^T$$

$$D_o = [0,1,0,1\ldots 0,1,0,1]^T \qquad \text{[Equation 7]}$$

When $D_e$ is multiplied by $\tilde{R}_R^*$ or $R_c$, an even-numbered frequency element of $\tilde{R}_R^*$ or $R_c$ may be calculated. When $D_o$ is multiplied by $\tilde{R}_R^*$ or $R_c$, an odd-numbered frequency element of $\tilde{R}_R^*$ or $R_c$ may be calculated.

$$R_o(k) = R_c(k)D_o(k)$$

$$R_e(k) = R_c(k)D_e(k) \qquad \text{[Equation 8]}$$

where k denotes a frequency index.

A multiplication in the frequency domain in Equation 8 may be replaced with a convolution operation in the time domain. Accordingly, in the time domain, Equation 9 may be represented as, $$r_o(n) = r_c(n) *_N \delta_o(n)$$

$$r_e(n) = r_c(n) *_N \delta_e(n) \quad \text{[Equation 9]}$$

where $*_N$ denotes a circular convolution operation with respect to a length N.

In this instance, $\delta_e$ and $\delta_o$ are all zero except for a case when n is equal to zero or n is equal to N/2. Accordingly, $r_e$ and $r_o$ may be represented as, $$r_o(n) = \frac{1}{2} r_c(n) + \frac{1}{2} r_c(n - N/2)_N \quad \text{[Equation 10]}$$

$$r_e(n) = \frac{1}{2} r_c(n) - \frac{1}{2} r_c(n - N/2)_N$$

That is, a complex operation in the frequency domain is not required to calculate an odd-numbered frequency element $R_o(k)$ and an even-numbered frequency element $R_e(k)$ of $\tilde{R}_R^*$ or $R_c$. As illustrated in Equation 10, $r_o(n)$ corresponding to $R_o(k)$, and $r_e(n)$ corresponding to $R_e(k)$ may be calculated through a conjugate operation, time-shift operation, and convolution operation of $\tilde{r}_R$.

Accordingly, by using a frequency shift property of the DFT, the relay signal $x_R$ may be represented as, $$x_R(n) = \frac{1}{2} r_c(n)(W_N^{-n} - W_N^n) + \quad \text{[Equation 11]}$$

$$\frac{1}{2} r_c(n - N/2)_N (W_N^{-n} + W_N^n)$$

$$= r_c(n) \cdot j\sin(2\pi n/N) +$$

$$r_c(n - N/2)_N \cdot \cos(2\pi n/N)$$

According to certain exemplary embodiment, the relay signal $x_R$ may be generated through the conjugate operation, time-shift operation, and convolution operation in the time domain as illustrated in Equation 11, without performing the operations in the frequency domain.

The operation to generate the relay signal $X_R$ in the frequency domain in Equation 4 may be replaced with the operation to generate the relay signal $x_R$ in the time domain in Equation 11. Accordingly, a number of multiplications with respect to complex numbers due to the operation in the frequency domain may be reduced.

Figure 4:
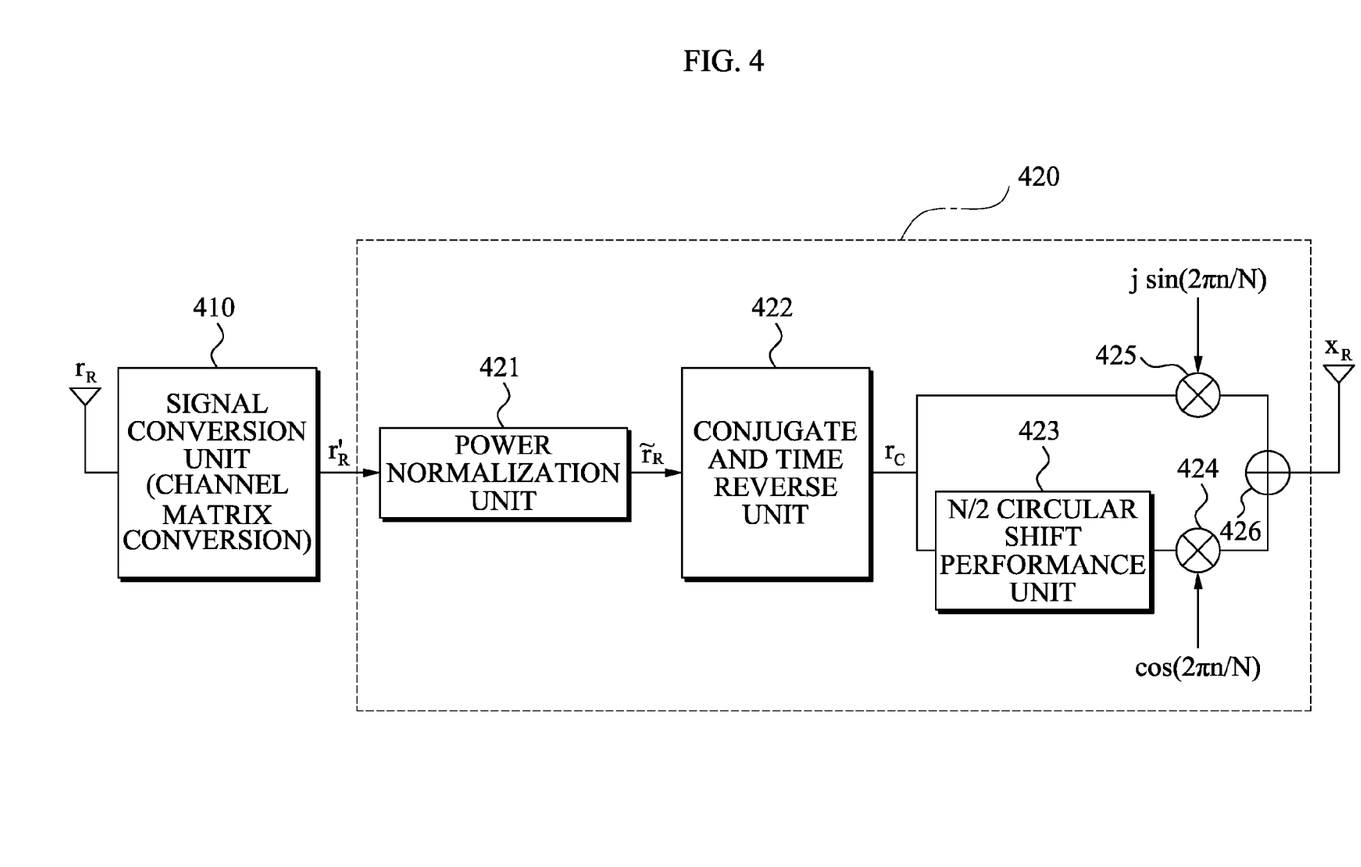
FIG. 4 is a block diagram illustrating an apparatus for generating a relay signal according to an exemplary embodiment.

FIG. 4 is a block diagram illustrating an apparatus for generating a relay signal according to an exemplary embodiment.

Referring to FIG. 4, the apparatus for generating a relay signal includes a signal conversion unit 410 and a relay signal generation unit 420.

A relay node receives a source signal $x_S$ transmitted from a source node for a time duration T1 through a channel, and detects a received signal $r_R$. The channel is formed between the source node and a relay node. As illustrated in FIG. 2, the source signal $x_S$ does not include a cyclic prefix, and thus the received signal $r_R$ also does not include the cyclic prefix. Also, when a signal where an $L_{SR}$ number of zeros are padded in the source signal $x_s$ is $\bar{x}_s$, the received signal $r_R$ may be represented as Equation 12. A relay node does not receive the source signal $x_S$ from the source node for a time duration T2, and thus the relay node may recognize that the source node transmits the signal $\bar{x}_S$.

$$r_R = \sqrt{E_{SR}} H_{SR} \bar{x}_S + n_R \quad \text{[Equation 12]}$$

When the received signal $r_R$ includes the cyclic prefix, the relay node may represent a channel matrix $H_{SR}$ of a channel as a circulant matrix. The channel is formed between the source node and the relay node. However, when the received signal $r_R$ does not include the cyclic prefix, the channel matrix $H_{SR}$ may not be generally represented as the circulant matrix.

The signal conversion unit 410 may enable the channel matrix $H_{SR}$ to be represented as the circulant matrix using an addition operation with respect to the received signal $r_R$.

The signal conversion unit 410 extracts samples corresponding to a first time duration from the received signal $r_R$. Also, the signal conversion unit 410 sums the received signal $r_R$ and the extracted samples in a second time duration, and generates a converted received signal. The second time duration is different from the first time duration. The first time duration may be a time duration from an end point of an FFT time duration to a point in time corresponding to an $L_{SR}$ number of samples. The second time duration may be a time duration from a starting point of the FFT time duration to the point in time corresponding to the $L_{SR}$ number of samples.

That is, the $L_{SR}$ number of samples may be extracted from the end point of the FFT time duration with respect to the received signal $r_R$. In this instance, the $L_{SR}$ is a length of a channel impulse response of a channel formed between the source node and the relay node.

Also, the signal conversion unit 410 sums the extracted samples and the $L_{SR}$ number of samples from the starting point of the FFT time duration with respect to the received signal $r_R$, and thereby may generate a converted received signal $r'_R$. That is, when a received signal is $r_R[n]$, a converted received signal $r'_R[n]$ may be represented as, $$r'_R[n] = \begin{cases} r_R[n] + r_R[N+n], & 0 \le n \le L_{SR} \\ r_R[n], & L_{SR} \le n \le N-1 \end{cases} \quad \text{[Equation 13]}$$

where N is the FFT time duration.

In this instance, the converted received signal $r'_R$ may be represented as, $$r'_R = \sqrt{E_{SR}} H'_{SR} x_S + n'_R \quad \text{[Equation 14]}$$

Referring to Equation 14, $H'_{SR}$ is an N×N circulant matrix. An $1^{th}$ element of a $k^{th}$ row of $H'_{SR}$ is identical to $[H'_{SR}]_{k,l} = h_{SR}((k-1) \bmod N)$. Here, $(k-1) \bmod N$ is a remainder obtained by dividing $(k-1)$ into N.

That is, the signal conversion unit 410 converts the received signal $r_R$ into the converted received signal $r'_R$ through the simple addition, and thereby may induce the channel matrix $H'_{SR}$ in the circulant matrix form. According to certain exemplary embodiment, although minor noise occurring when generating the converted received signal $r'_R$ increases, the channel matrix $H'_{SR}$ in the circulant matrix form may be induced even when the source signal $x_S$ does not include the cyclic prefix.

According to certain exemplary embodiment, since the cyclic prefix is not essential, data may be assigned for a time duration taken by the cyclic prefix, and thus a frequency efficiency and data transmission rate may increase.

Also, the relay signal generation unit 420 includes a power normalization unit 421, conjugate and time reverse unit 422, N/2 circular shift performance unit 423, first multiplication unit 424, second multiplication unit 425, and addition unit 426. Since the relay signal generation unit 420 has been described in detail with reference to FIG. 3, the description of the relay signal generation unit 420 is omitted.

The power normalization unit 421 normalizes power of the converted received signal $r'_R$ and generates $\tilde{r}_R$. The conjugate and time reverse unit 422 generates $r_c(\tilde{r}_R^*(-n)_N = r_c(n))$. $r_c$ is processed through the N/2 circular shift performance unit 423, first multiplication unit 424, second multiplication unit 425, and addition unit 426, and a relay signal $x_R$ is generated. Specifically, the relay signal $x_R$ may be represented as Equation 11.

According to certain exemplary embodiment, the apparatus for generating a relay signal may generate the relay signal cooperating with the source signal through a simple addition with respect to the received signal, even when the source signal does not include the cyclic prefix. Also, the source signal may be generated through the operation in the time domain, not frequency domain, and thus a computational complexity for generating the relay signal may be reduced.

Figure 5:
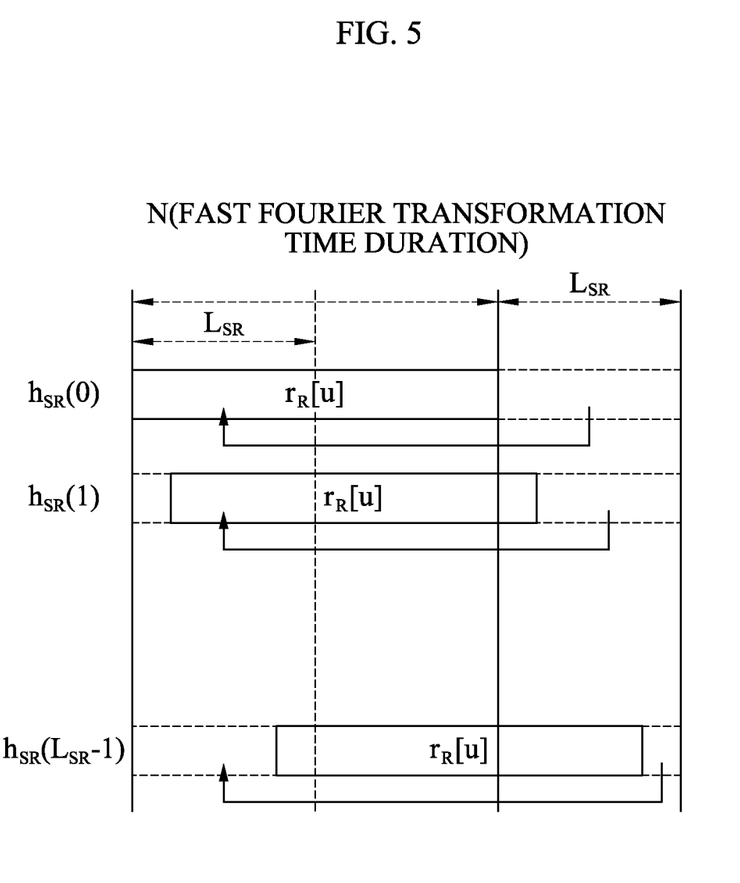
FIG. 5 is a diagram illustrating a signal received by a relay node according to an exemplary embodiment.

FIG. 5 is a diagram illustrating a signal received by a relay node according to an exemplary embodiment.

Referring to FIG. 5, the relay node receives a source signal transmitted from a source node through a channel formed between the source node and the relay node. The channel is a multi-path fading channel.

The source signal is transmitted from the source node to the relay node through $h_{SR}(0)$, $h_{SR}(1)$, and $h_{SR}(L_{SR}-1)$. Accordingly, the relay node detects a received signal $r_R[n]$ with a time difference corresponding to each of $h_{SR}(0)$, $h_{SR}(1)$, and $h_{SR}(L_{SR}-1)$.

A received signal $r_R[n]$ corresponding to $h_{SR}(0)$ is included in a FFT time duration, whereas a received signal $r_R[n]$ corresponding to $h_{SR}(1)$ and a received signal $r_R[n]$ corresponding to $h_{SR}(L_{SR}-1)$ are not included in the FFT time duration. In this instance, the relay node extracts samples corresponding to an end point of the FFT time duration to an $L_{SR}$ number of sample points in time from the received signal $r_R[n]$.

Also, the relay node sums the extracted samples and samples corresponding to a starting point of the FFT time duration to the $L_{SR}$ number of sample points in time, and generates a converted received signal.

Thus, according to certain exemplary embodiment, even when the source signal does not include the cyclic prefix, the converted received signal may be generated through a simple addition with respect to the received signal. Also, a channel matrix in a circulant matrix form may be induced using the converted received signal.

Figure 6:
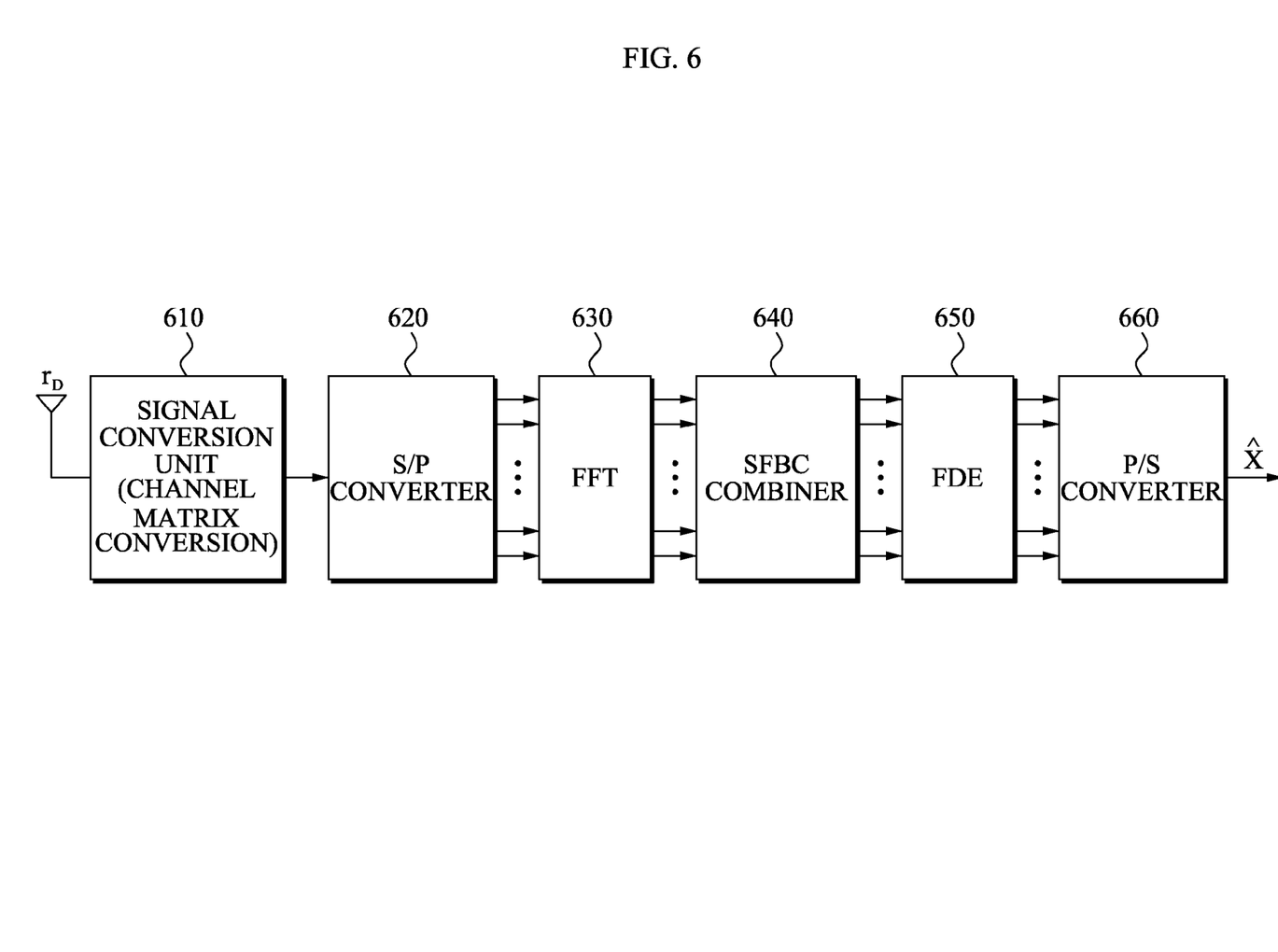
FIG. 6 is a block diagram illustrating an apparatus for receiving a signal of a destination node according to an exemplary embodiment.

FIG. 6 is a block diagram illustrating an apparatus for receiving a signal of a destination node according to an exemplary embodiment.

Referring to FIG. 6, the apparatus for receiving a signal of a destination node includes a signal conversion unit 610, S/P converter 620, FFT 630, SFBC combiner 640, frequency domain equalizer (FDE) 650, and P/S converter 660.

The destination node receives a source signal and a relay signal, and detects a received signal $r_D$. The source signal is transmitted from a source node, and the relay signal is transmitted from a relay node. The received signal $r_D$ includes a received source signal and received relay signal.

When a signal where an $L_{max} = \max(L_{SD}, L_{RD})$ number of zeros are padded in a relay signal $x_R$ is $\bar{x}_R$, and a signal where the $L_{max} = \max(L_{SD}, L_{RD})$ number of zeros are padded in a source signal $x_S$ is $\bar{x}_R$, the relay node and source node transmit the signals $\bar{x}_R$ and $\bar{x}_S$, since the destination node does not receive the signal for a time T1. Accordingly, the received signal $r_D$ received by the destination node may be represented as, $$r_D = \sqrt{E_{RD}} H_{RD} \bar{x}_R + \sqrt{E_{SD}} H_{SD} \bar{x}_S + n_D \quad \text{[Equation 15]}$$

where $E_{RD}$ denotes an energy coefficient of the destination node with respect to a channel $H_{RD}$ formed between the destination node and the relay node, $E_{SD}$ denotes an energy coefficient of the destination node with respect to a channel $H_{SD}$ formed between the destination node and the source node, and $n_D$ denotes noise.

In this instance, the signal conversion unit 610 of the destination node converts the received source signal to form a first channel matrix of a first channel into a circulant matrix using samples corresponding to a first time duration. The samples are extracted from the received source signal, and the first channel is formed between the source node and the destination node. Also, the signal conversion unit 610 of the destination node converts the received relay signal to form a second channel matrix of a second channel into the circulant matrix using samples corresponding to a second time duration. The samples are extracted from the received relay signal, and the second channel is formed between the relay node and the destination node.

Since the relay signal $x_R$ and source signal $x_S$ do not include a cyclic prefix, the channel $H_{RD}$ and channel $H_{SD}$ are not represented as the circulant matrix form. However, the signal conversion unit 610 converts the received signal $r_D$, and thus the channel matrix in the circulant matrix form may be induced.

That is, the signal conversion unit 610 of the destination node may extract, from the received signal $r_D$, an $L_{max}$ number of samples from an end point of a FFT time duration, similar to the signal conversion unit 410 illustrated in FIG. 4 of the relay node. Also, the signal conversion unit 610 of the destination node sums the extracted samples and an $L_{max}$ number of samples from a starting point of the FFT time duration, and thereby may generate a converted received signal $r'_D$.

The converted received signal $r'_D$ may be represented as, $$r'_D = \sqrt{E_{RD}} H'_{RD} x_R + \sqrt{E_{SD}} H'_{SD} x_S + n'_D$$

where denotes noise of the converted received signal.

$$[H'_{SD}]_{k,l} = h_{SD}((k-l) \bmod N), \text{ and } [H'_{RD}]_{k,l} = h_{RD}((k-l) \bmod N) \quad \text{[Equation 16]}$$

Referring to Equation 16, it may be known that the channel $H_{RD}$ and channel $H_{SD}$ are converted into a channel $H'_{RD}$ and channel $H'_{SD}$ in the circulant matrix form. That is, although the relay signal $x_R$ and source signal $x_S$ do not include the cyclic prefix, the signal conversion unit 610 of the destination node may convert the channel $H_{RD}$ and channel $H_{SD}$ into the channel $H'_{RD}$ and channel $H'_{SD}$ in the circulant matrix form through a simple addition with respect to the received signal $r_D$.

In this instance, referring to the description used to describe FIG. 3, the relay signal $x_R$ may be represented as, $$X_R = W^H PS\{W\tilde{r}_R\}^* \quad \text{[Equation 17]}$$

$$= \sqrt{\frac{E_{SR}}{E_{SR}+N}} W^H PS\{WH'_{SR} x_S\}^* + \frac{N_R}{\sqrt{E_{SR}+N_0}}$$

$$S = I_{\frac{N}{2} \times \frac{N}{2}} \otimes \begin{bmatrix} 1 & 0 \\ 0 & -1 \end{bmatrix}$$

$$P = I_{\frac{N}{2} \times \frac{N}{2}} \otimes \begin{bmatrix} 0 & 1 \\ 1 & 0 \end{bmatrix}$$

where $\otimes$ denotes a Kronecker product operation.

The converted received signal $r'_D$ may be represented as, $$r'_D = \sqrt{\frac{E_{RD}E_{SR}}{E_{SR}+(1+L_{SR}/N)N_0}} H'_{RD}W^H PS\{WH'_{SR}x_S\}^* + \sqrt{E_{SD}} H'_{SD}x_S + \sqrt{E_{RD}} H'_{RD}n''_R + n'_D \quad \text{[Equation 18]}$$

Referring to Equation 18, $H'_{RD}W^H PS\{WH'_{SR}x_S\}^*$ may be represented as, $$H'_{RD}W^H PS\{WH'_{SR}x_S\}^* = W^H \Lambda_{RD}PS\Lambda^*_{SR}\{Wx_S\}^* \quad \text{[Equation 19]}$$
$$= W^H \Lambda_{RD}P\Lambda^*_{SR}S\{Wx_S\}^*$$

where $\Lambda_{RD}$ denotes a frequency response of a channel formed between the destination node and the relay node, and $\Lambda_{SR}$ denotes a frequency response of a channel formed between the source node and the relay node. $\Lambda_{RD}=WH'_{RD}W^H$, and $\Lambda_{SR}=WH'_{SR}W^H$.

In this instance, similarities in a channel frequency response of adjacent sub-channels exist. Accordingly, using $\Lambda_{SR}(2k) \approx \Lambda_{SR}(2k+1)$, Equation 19 may be represented as, $$H'_{RD}W^H PS\{WH'_{SR}x_S\}^* = W^H \Lambda_{RD}PS\Lambda^*_{SR}\{Wx_S\}^* \quad \text{[Equation 20]}$$
$$= W^H \Lambda_{RD}P\Lambda^*_{SR}S\{Wx_S\}^*$$
$$\cong W^H \Lambda_{RD}P\Lambda^*_{SR}PS\{Wx_S\}^*$$

Thus, the converted received signal $r'_D$ may be represented as, $$r'_D = \sqrt{\gamma_1} W^H \Lambda_{EQ}PS\{Wx_S\}^* + \sqrt{\gamma_2} H'_{SD}x_S + n \quad \text{[Equation 21]}$$
$$\gamma_1 = \sqrt{\frac{E_{RD}E_{SR}}{E_{SR}+(1+L_{SR}/N)N_0}}$$
$$\gamma_2 = \sqrt{E_{SD}}$$
$$\Lambda_{EQ} = \Lambda_{RD}\Lambda^*_{SR}$$

The converted received signal $r'_D$ of Equation 21 is separated in time through the S/P converter 620. Also, the separated converted received signal $r'_D$ is converted into a signal $R_D'$ in a frequency domain through the FFT 630. The signal $R_D'$ in the frequency domain may be represented as, $$R_D' = \gamma_1 \Lambda_{EQ}PSX_S^* + \gamma_2 \Lambda_{SD}X_S + N \quad \text{[Equation 22]}$$

In this instance, the SFBC combiner 640 combines the signal $R_D'$ according to a Minimum Mean Square Error (MMSE) criterion. Also, the FDE 650 equalizes an output of the SFBC combiner 640 in the frequency domain.

Also, the signal $R_D'$ may be separated into an even-numbered frequency element and an odd-numbered frequency element, which may be represented as, $$R_D'(2k) = -\sqrt{\gamma_1}\Lambda_{EQ}X_S^*(2k+1) + \sqrt{\gamma_2}\Lambda_{SD}(2k)X_S(2k)+N(2k)$$

$$R'hd D^*(2k+1) = -\sqrt{\gamma_1}\Lambda^*_{EQ}(2k+1)X_S(2k) + \sqrt{\gamma_2}\Lambda^*_{SD}(2k+1)X_S^*(2k+1)+N^*(2k+1) \quad \text{[Equation 23]}$$

When using Equation 23 and the similarities of the channel frequency response of adjacent sub-channels, Equation 24 may be deduced.

$$R_k' = \begin{bmatrix} R_D'(2k) \\ R_D'^*(2k+1) \end{bmatrix} \quad \text{[Equation 24]}$$
$$\cong \begin{bmatrix} \Lambda'_{SD}(2k) & -\Lambda'_{EQ}(2k) \\ \Lambda'^*_{EQ}(2k) & \Lambda'^*_{SD}(2k) \end{bmatrix} \begin{bmatrix} X(2k) \\ X^*(2k+1) \end{bmatrix} + \begin{bmatrix} N(2k) \\ N^*(2k+1) \end{bmatrix}$$
$$= \Lambda'_k X'_k + N'_k$$

Referring to Equation 24, an equalized signal $Y_k$ and a signal $\hat{X}_S$ combined according to the MMSE criterion may be represented as, $$Y_k = \Lambda'^H_k R'_k = \begin{bmatrix} \tilde{\Lambda}(k) & 0 \\ 0 & \tilde{\Lambda}(k) \end{bmatrix} X'_k + \Lambda'^H_k N'_k \quad \text{[Equation 25]}$$
$$\tilde{\Lambda}(k) = \gamma_1|\Lambda_{EQ}(2k)|^2 + \gamma_2|\Lambda_{SD}(2k)|^2$$
$$\hat{X}'_k = \left(\Lambda'^H_k \Lambda'_k - \frac{1}{SNR}I_{2\times 2}\right)^{-1} Y_k = \begin{bmatrix} \hat{X}_S(2k) \\ \hat{X}^*_S(2k+1) \end{bmatrix}$$

Also, the signal $\hat{X}_S$ may be represented as, $$\hat{X}_S=[\hat{X}_S(0),\hat{X}_S(1),\hat{X}_S(2)\ldots\hat{X}_S(N-1)]^T \quad \text{[Equation 26]}$$

Also, an estimated value of the source signal $X_S$ in a time domain may be represented as, $$\hat{x}_S=W^H\hat{X}_S \quad \text{[Equation 27]}$$

With With reference to disclosures corresponding to FIGS. 1 though 6, a relay signal generation method of a relay node according an exemplary embodiment includes an operation of receiving a source signal transmitted from a source node to a relay node and detecting a received signal, an operation of extracting samples corresponding to a first time duration from the received signal, summing the received signal and the extracted samples in a second time duration, and generating a converted received signal, the second time duration being different from the first time duration, an operation of generating a relay signal cooperating with the source signal based on the converted received signal according to an SFBC scheme, and an operation of transmitting the generated relay signal to a destination node.

Also, a signal receiving method of a destination node includes an operation of receiving a source signal, transmitted from a source node to a destination node, and a relay signal, transmitted from a relay node to the destination node, and detecting a received source signal and a received relay signal, an operation of converting the received source signal to form a first channel matrix of a first channel into a circulant matrix using samples, corresponding to a first time duration and extracted from the received source signal, and converting the received relay signal to form a second channel matrix of a second channel into the circulant matrix using samples, corresponding to a second time duration and extracted from the received relay signal, and an operation of converting the converted received source signal and the converted received relay signal into signals in a frequency domain. In this instance, the source signal and the relay signal are coded according to, for example, a SFBC scheme. Also, the first channel is formed between the source node and the destination node, and the second channel is formed between the relay node and the destination node.

Figure 7:
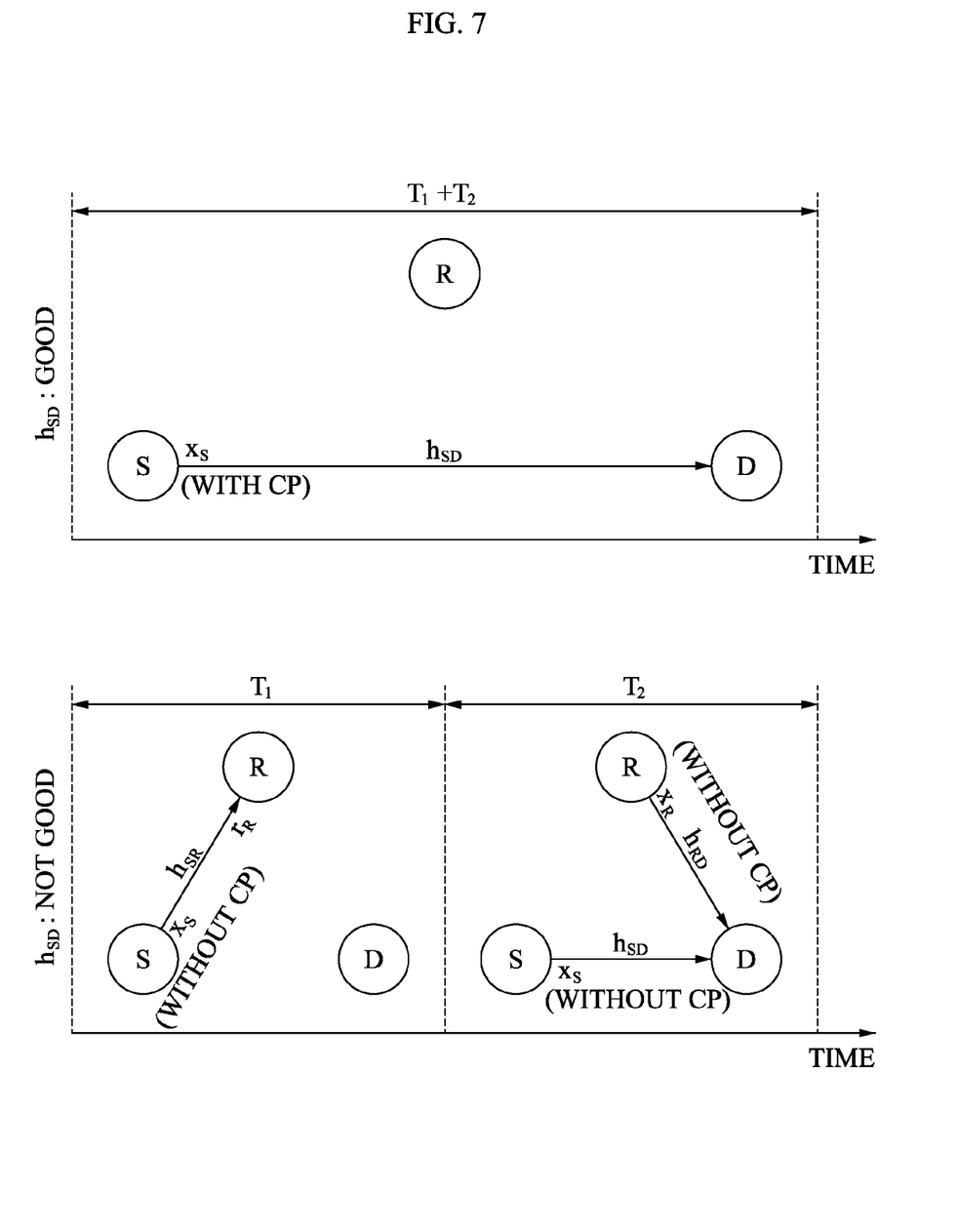
FIG. 7 is a diagram illustrating a source node, relay node, and destination node communicating according to a direction communication mode or relay node usage mode according to an exemplary embodiment.

FIG. 7 is a diagram illustrating a source node, relay node, and destination node communicating according to a direction communication mode or relay node usage mode according to an exemplary embodiment.

Referring to FIG. 7, the source node selects any one of a direct communication mode and a relay node usage mode as a communication mode depending on the channel state of a channel $h_{SD}$. The channel $h_{SD}$ is formed between the source node and the destination node. Also, the source node transmits a source signal $x_s$ to the relay node or destination node depending on the selected communication mode.

The channel state of the channel $h_{SD}$ may be determined depending on a signal to interference and noise ratio (SINR). Specifically, when the SINR is greater than a predetermined threshold value, the channel state of the channel $h_{SD}$ may be determined to be good. When the SINR is equal to or less than the predetermined threshold value, the channel state of the channel $h_{SD}$ may be determined to be inferior.

When the channel state of the channel $h_{SD}$ is good, the source node selects the direct communication mode as the communication mode, and transmits the source signal $x_S$ to the destination node for a time T1+T2. The source signal $x_s$ includes a cyclic prefix. The destination node removes the cyclic prefix from a received signal with respect to the source signal $x_S$, and detects the received signal. Accordingly, when the channel state of the channel $h_{SD}$ is good, the source node may directly transmit the source signal $x_S$ to the destination node without using the relay node, and achieve a high data transmission rate.

When the channel state of the channel $h_{SD}$ is inferior, the source node selects the relay node usage mode as the communication mode, and transmits the source signal $x_S$ to the destination node using the relay node. That is, the source node transmits the source signal $x_S$ to the relay node for a time T1. Also, the source node and the relay node transmit the source signal $x_S$ and a relay signal $x_R$ to the destination node for a time T2. The relay signal $x_R$ cooperates with the source signal $x_S$, and is generated according to an SFBC scheme.

The relay node converts a received signal $r_R$ with respect to the source signal $x_S$ to form a channel matrix of a channel into a circulant matrix. Also, the relay node generates the relay signal $x_R$ using the converted received signal $r_R$. The channel is formed between the source node and the relay node. The source signal $x_S$ and relay signal $x_R$ do not include the cyclic prefix, which is not described in greater detail, since it has been described above.

Thus, the source node selects an appropriate communication mode according to the channel state of the channel formed between the source node and destination node, and thereby may improve a data transmission rate. In particular, when the source node selects the relay node usage mode as the communication mode, the data transmission rate may be highly improved, since the source signal $x_S$ and relay signal $x_R$ do not include the cyclic prefix.

However, when the source node selects any one of the direct communication mode and the relay node usage mode as the communication mode, the source node may be required to transmit mode selection information associated with the selected communication mode to the relay node and destination node.

While certain exemplary embodiments have been described with respect to a SFBC scheme, it is understood that this is only an illustration, and other schemes may be applicable, for example, teachings disclosed herein may be applied to a space time block code (STBC) scheme.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a relay signal, the apparatus comprising:
  a signal receiving unit which receives a source signal transmitted from a source node to a relay node and detects a received signal;
  a signal conversion unit which extracts samples corresponding to a first time duration from the received signal, sums the received signal and the extracted samples in a second time duration, and generates a converted received signal, the second time duration being different from the first time duration;
  a relay signal generation unit which generates a relay signal cooperating with the source signal based on the converted received signal according to a space frequency block code (SFBC) scheme; and
  a signal transmission unit which transmits the generated relay signal to a destination node,
  wherein the source node generates the source signal and the relay signal generation unit generates the relay signal, the source signal and the relay signal being without a cyclic prefix.

2. The apparatus of claim 1, wherein the signal conversion unit generates the converted received signal to form a channel matrix of a channel into a circulant matrix, the channel being formed between the source node and the relay node.

3. The apparatus of claim 1, wherein the first time duration is previously determined considering a length of a channel impulse response of a channel formed between the source node and the relay node.

4. The apparatus of claim 1, wherein the relay signal generation unit processes the converted received signal in a time domain and generates the relay signal.

5. The apparatus of claim 1, wherein the relay signal generation unit performs a conjugate operation and a time-shift operation with respect to the converted received signal in a time domain and generates the relay signal.

6. The apparatus of claim 1, wherein the destination node receives the relay signal, detects a destination node received signal, sums the destination node received signal and samples of a time duration which is previously determined from among the destination node received signal, generates a converted destination node received signal, and converts the converted destination node received signal into a signal in a frequency domain.

7. The apparatus of claim 1, wherein the signal receiving unit receives the source signal in a first time slot and detects the received signal, and the signal transmission unit transmits the relay signal to the destination node in a second time slot different from the first time slot.

8. An apparatus for receiving a signal, the apparatus comprising:
a signal receiving unit which receives a source signal, transmitted from a source node to a destination node, and a relay signal, transmitted from a relay node to the destination node, and detects a received source signal and a received relay signal, the source signal and the relay signal being coded according to a SFBC scheme;
a signal conversion unit which converts the received source signal to form a first channel matrix of a first channel into a circulant matrix using samples, corresponding to a first time duration and being extracted from the received source signal, and converts the received relay signal to form a second channel matrix of a second channel into the circulant matrix using samples, corresponding to a second time duration and being extracted from the received relay signal, the first channel being formed between the source node and the destination node, and the second channel being formed between the relay node and the destination node; and
a Fourier transformer which converts the converted received source signal and the converted received relay signal into signals in a frequency domain, wherein
the source signal and the relay signal do not include a cyclic prefix.

9. The apparatus of claim 8, wherein the signal conversion unit sums the received source signal and the samples, corresponding to the first time duration and being extracted from the received source signal, in a time duration different from the first time duration to convert the received source signal, and sums the received relay signal and the samples, corresponding to the second time duration and being extracted from the received relay signal, in another time duration different from the second time duration to convert the received relay signal.

10. The apparatus of claim 8, further comprising:
a combiner which combines the signals in the frequency domain according to a Minimum Mean Square Error (MMSE) criterion.

11. The apparatus of claim 10, further comprising:
a Frequency Domain Equalizer (FDE) which equalizes an output of the combiner in the frequency domain.

12. The apparatus of claim 8, wherein the first time duration is previously determined considering a length of a channel impulse response of the first channel, and the second time duration is previously determined considering a length of a channel impulse response of the second channel.

13. The apparatus of claim 8, wherein the relay signal is generated by the relay node through an operation in a time domain.

14. A relay signal generation method of a relay node, comprising:
receiving a source signal transmitted from a source node to a relay node and detecting a received signal;
extracting samples corresponding to a first time duration from the received signal, summing the received signal and the extracted samples in a second time duration, and generating a converted received signal, the second time duration being different from the first time duration;
generating a relay signal cooperating with the source signal based on the converted received signal according to an SFBC scheme; and
transmitting the generated relay signal to a destination node,
the source node generates the source signal and the relay signal generation unit generates the relay signal, the source signal and the relay signal being without a cyclic prefix.

15. The relay signal generation method of claim 14, wherein the generating of the converted received signal generates the converted received signal to form a channel matrix of a channel into a circulant matrix, the channel being formed between the source node and the relay node.

16. The relay signal generation method of claim 14, wherein the generating of the relay signal processes the converted received signal in a time domain and generates the relay signal.

17. A computer-readable recording medium storing a program for implementing a relay signal generation method of a relay node, comprising:
receiving a source signal transmitted from a source node to a relay node and detecting a received signal;
extracting samples corresponding to a first time duration from the received signal, summing the received signal and the extracted samples in a second time duration, and generating a converted received signal, the second time duration being different from the first time duration;
generating a relay signal cooperating with the source signal based on the converted received signal according to an SFBC scheme; and
transmitting the generated relay signal to a destination node.

18. An apparatus for generating a source signal, the apparatus comprising:
a channel state recognition unit which recognizes a channel state of a channel formed between a source node and a destination node;
a mode selection unit which selects any one of a direct communication mode and a relay node usage mode as a communication mode depending on the channel state; and
a source signal generation unit which generates a source signal depending on the selected communication mode,
wherein the direct communication mode directly transmits the source signal including a cyclic prefix to the destination node, and the relay node usage mode transmits the source signal without the cyclic prefix to the destination node using the relay node.

19. The apparatus of claim 18, wherein the relay node generates, using an SFBC scheme, a relay signal cooperating with the source signal without the cyclic prefix.

20. The apparatus of claim 19, wherein the relay node converts a received signal with respect to the source signal to form a channel matrix of a channel into a circulant matrix, and generates the relay signal using the converted received signal, the channel being formed between the source node and the relay node.

21. The apparatus of claim 18, wherein the mode selection unit selects any one of the direction communication mode and the relay node usage mode as the communication mode depending on a signal to interference and noise ratio (SINR) of the channel formed between the source node and the destination node.

22. The apparatus of claim 18, further comprising:
a selection information transmission unit which transmits, to the relay node and the destination node, mode selection information associated with the selected communication mode.

* * * * *